Jan. 7, 1969
L. G. SIMJIAN
3,420,336
ARTICLE DELIVERY SYSTEM
Filed July 19, 1967
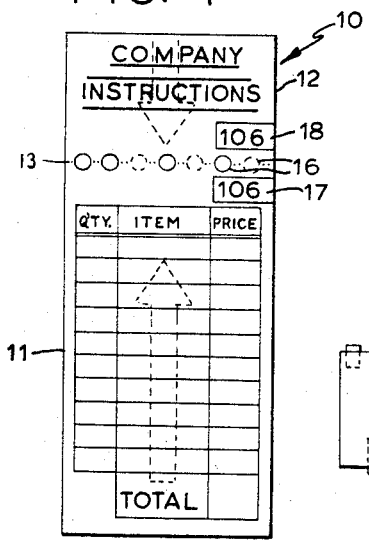
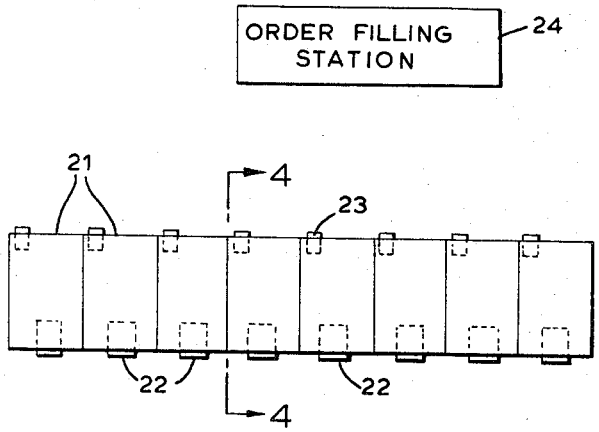
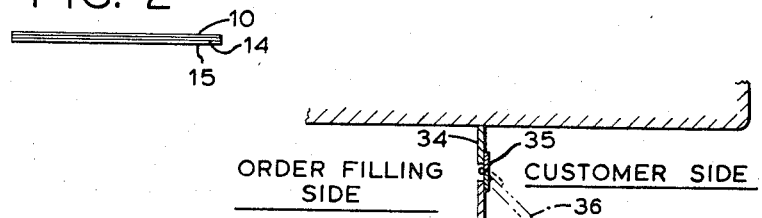
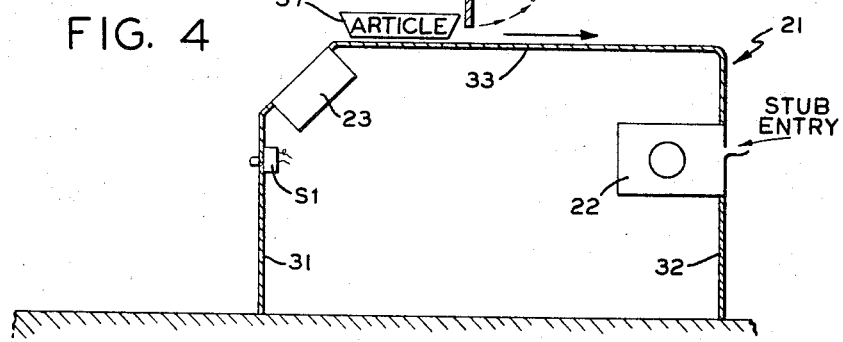
INVENTOR.
Luther G. Simjian

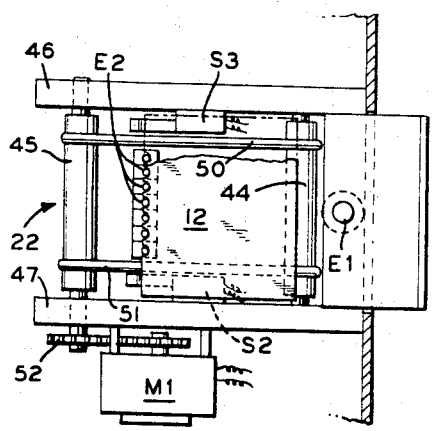
FIG. 5
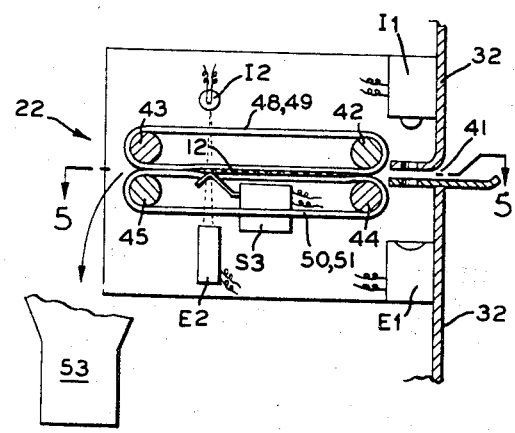
FIG. 6
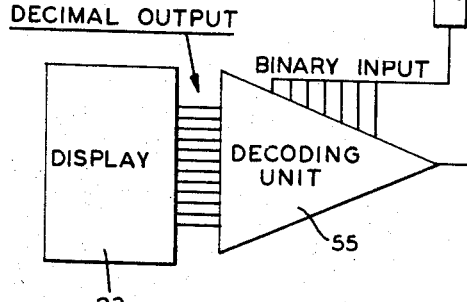
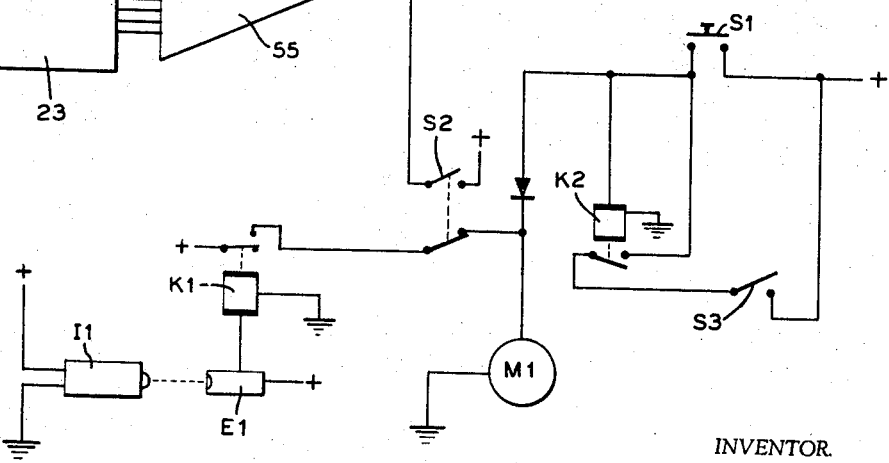
FIG. 7

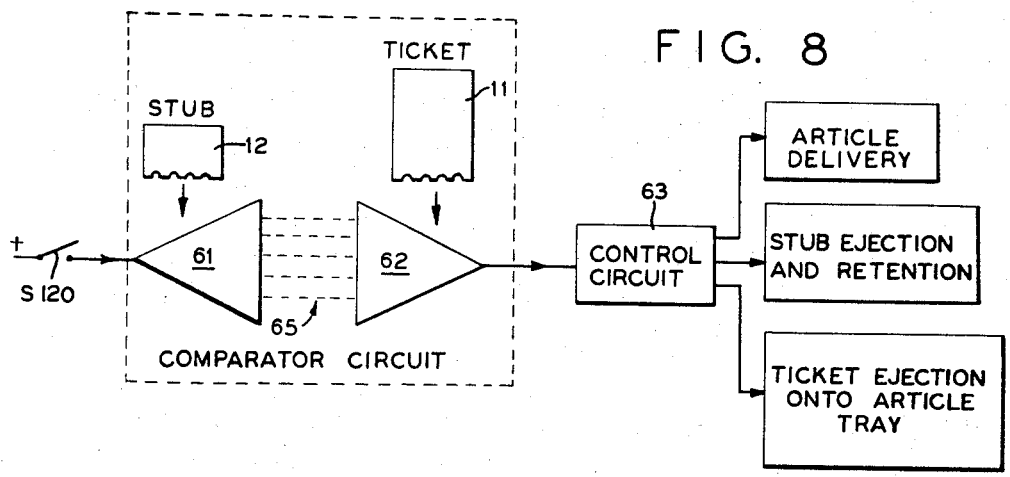
FIG. 8
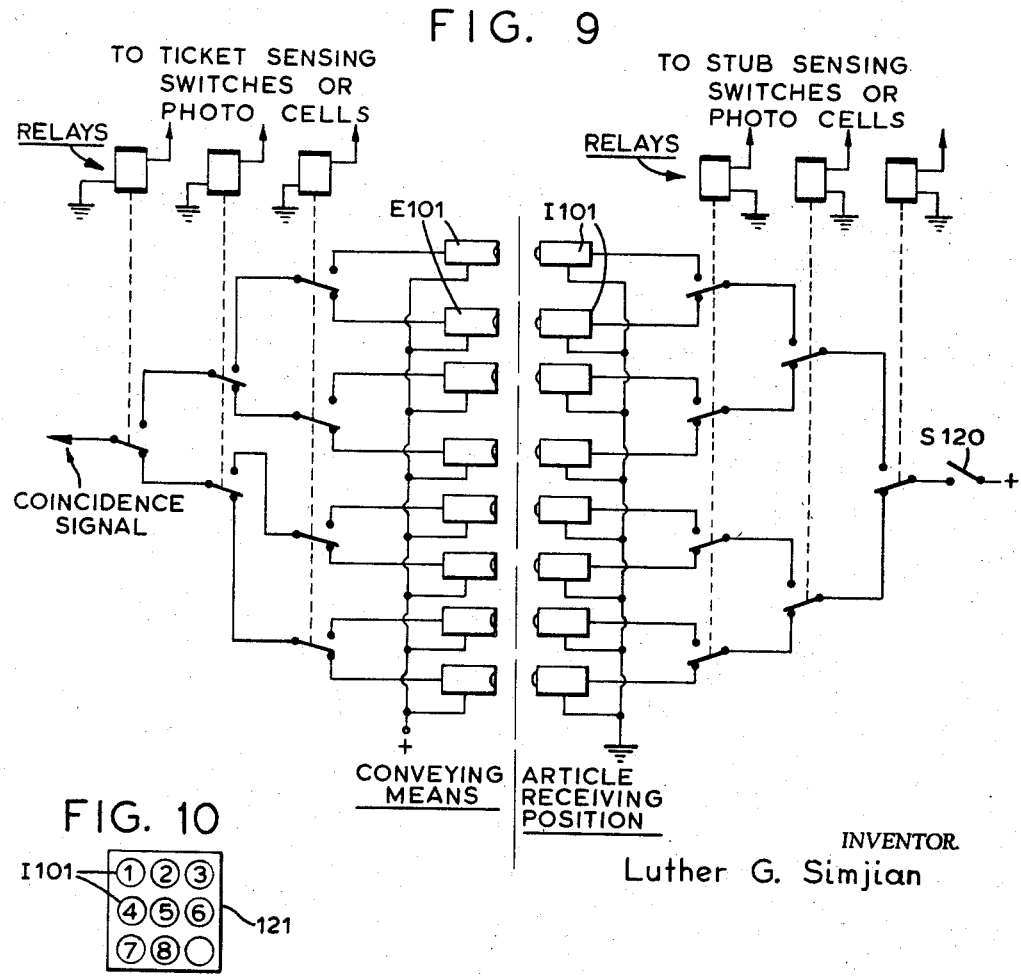
FIG. 9
FIG. 10

Luther G. Simjian
INVENTOR.

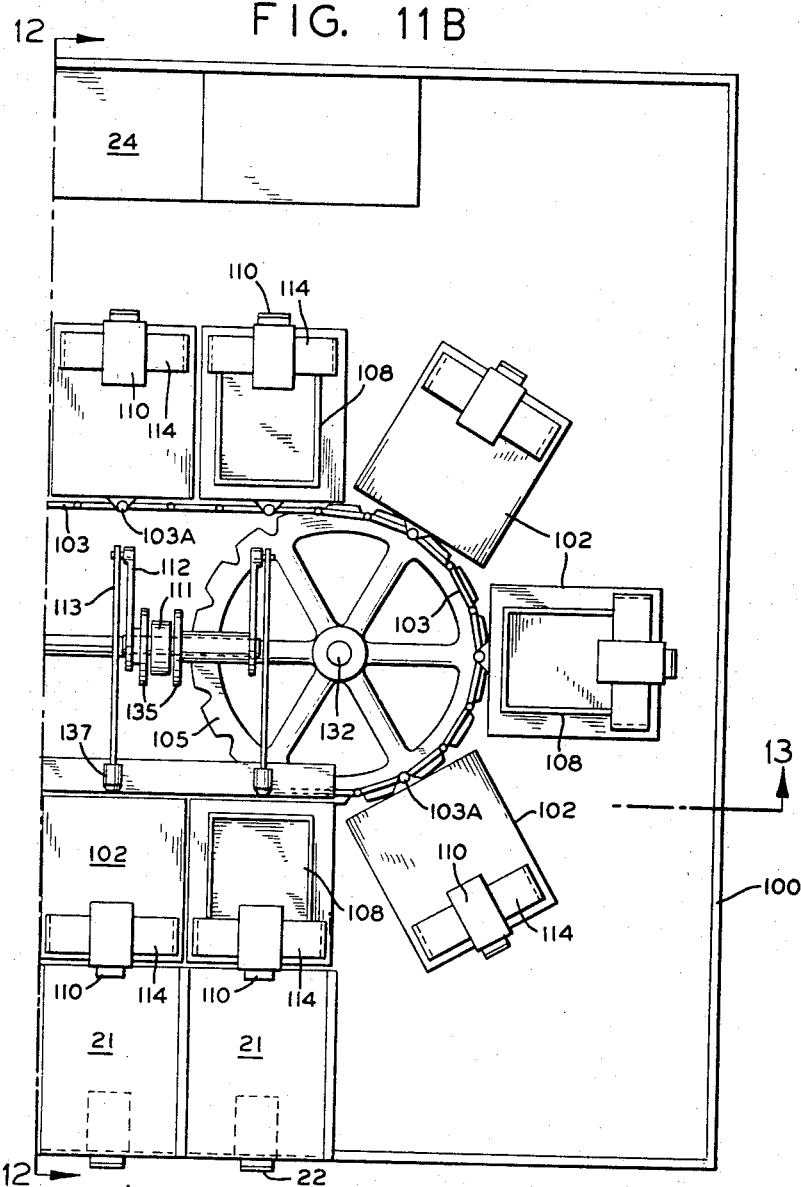

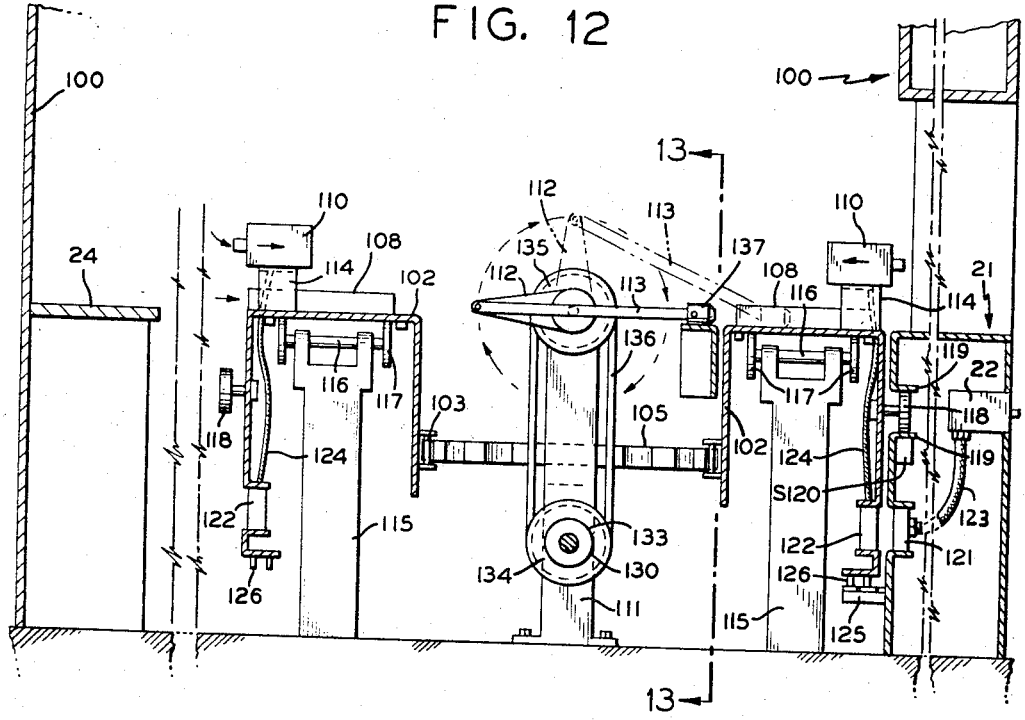
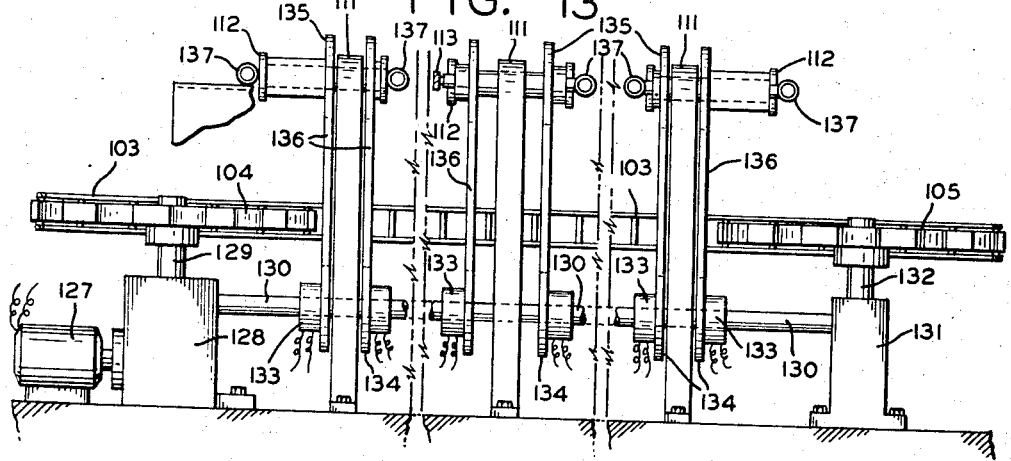

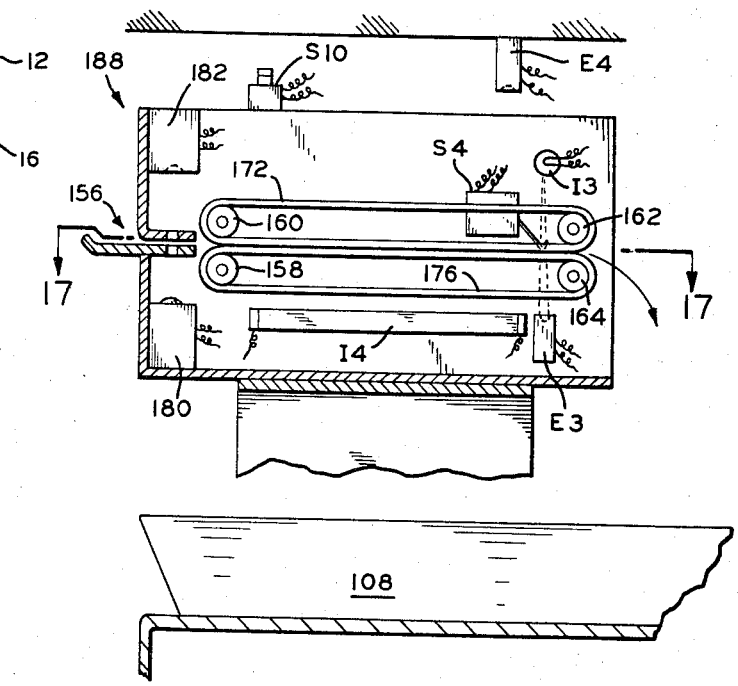
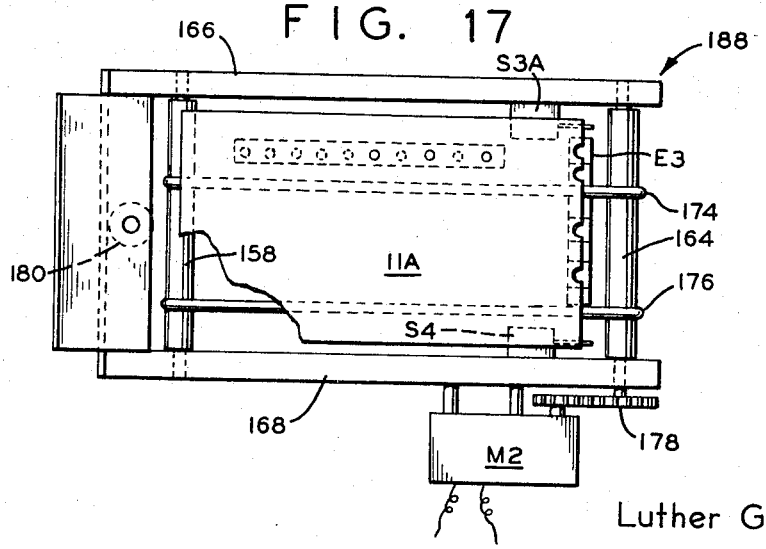

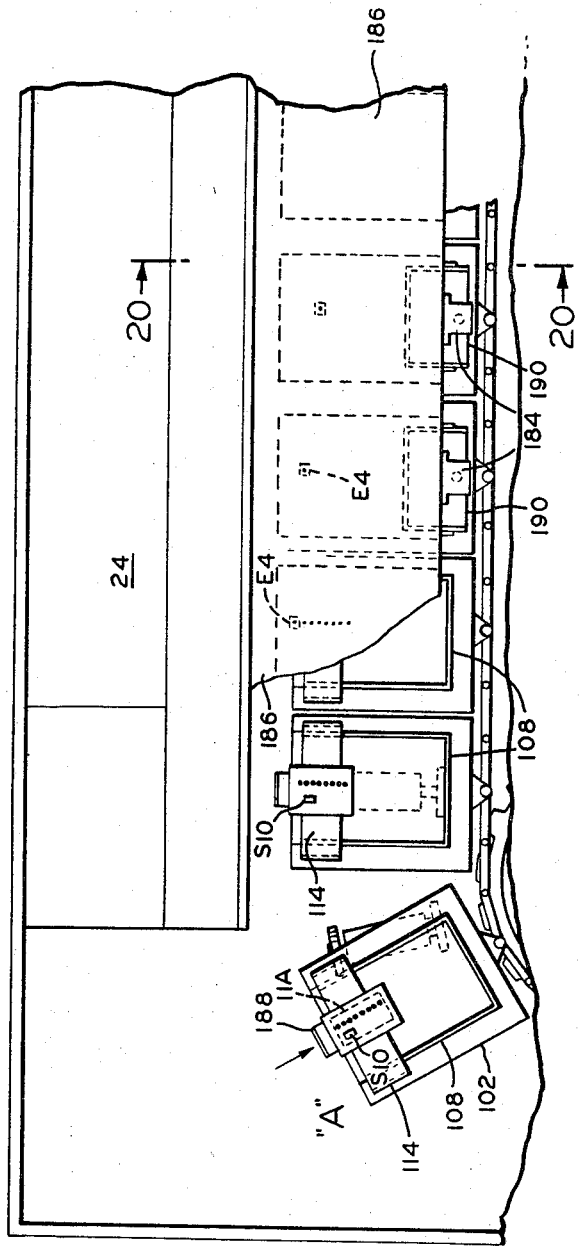
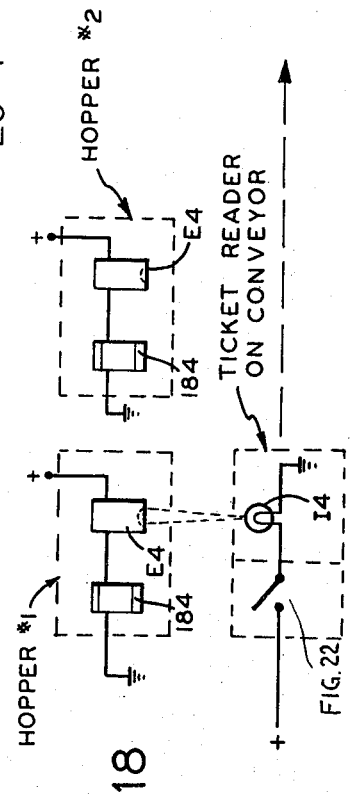
FIG. 19
FIG. 18
Luther G. Simjian
INVENTOR.

Jan. 7, 1969 L. G. SIMJIAN 3,420,336
ARTICLE DELIVERY SYSTEM
Filed July 19, 1967 Sheet 9 of 10

Luther G. Simjian
INVENTOR.

BY:

Erwin B. Steinberg
AGENT.

United States Patent Office 3,420,336
Patented Jan. 7, 1969

3,420,336
ARTICLE DELIVERY SYSTEM
Luther G. Simjian, Laurel Lane,
Greenwich, Conn. 06830
Filed July 19, 1967, Ser. No. 654,610
U.S. Cl. 186—1          10 Claims
Int. Cl. E04h *3/04*

ABSTRACT OF THE DISCLOSURE

An article delivery system comprising a plurality of article receiving platforms, each adapted to receive a check means having an identifying code which, in the manual delivery mode, is displayed to an order filling side. For automatic article delivery, conveying means receive the article to be delivered together with an identifying check means. Responsive to a match between the identifying check means associated with the article and that disposed at a respective platform, the article is delivered to the particular platform. The articles are dispensed for delivery by the conveying means in accordance with an article selection code contained on the check means.

---

This invention is related to my copending application for U.S. Letters Patent Ser. No. 529,556, filed Feb. 23, 1966 entitled "Article Delivery System," now U.S. Patent No. 3,339,671, dated Sept. 5, 1967.

This invention refers generally to an article delivery system and concerns, more particularly, an article delivery system which employs a plurality of individual article receiving positions operative in conjunction with check means for determining the position at which such delivery occurs.

Quite specifically, this application differs from the above stated patent application in that it includes means for automatically dispensing and assembling the articles which are delivered to the receiving position.

The article delivery system described hereafter is particularly suited for food service at drive-in restaurants and supermarkets, but it shall be clearly understood that the same or a slightly modified principle may be used also for the delivery of ordered goods at a department store, a dry-cleaning establishment, etc., to name but a few of the many applications.

In a broad sense, the present invention includes a plurality of article receiving positions which conventionally may be arranged in side-by-side relation. The customer by means of a ticket or other check means orders articles for delivery and pays for such articles, the method of payment does not form, however, a part of this disclosure. The customer holding a check means, such as the stub of the original ticket, uses this check means to control the delivery of the ordered articles, specifically, to select the receiving position at which such delivery occurs. The method of delivery may be a manual one, or in alternative embodiment is automated by the combination and interrelation of various instrumentalities which will be described.

One of the principal objects of this invention is, therefore, the provision of a new and improved article delivery system.

Another important object of this invention is the provision of a novel article delivery system which includes a plurality of article receiving positions and includes means to provide for the receipt of articles in response to check means deposited at such an article receiving position.

Another important object of this invention is the provision of a means for causing a check means which is deposited to control the delivery of an article to be rendered inaccessible for surreptitious removal subsequent to the delivery of such article.

A further object of this invention is the provision of a plurality of receiving positions, each including a check acceptance means and an article receiving means, whereby the check means deposited in the acceptance means cooperates with certain control means to provide for the proper article to be received at such position.

Other and still further objects of this invention will be more clearly apparent by reference to the following description when taken in conjunction with the accompanying drawings in which:

FIGURE 1 is a top plan view of a typical check means, such as a ticket and stub forming a part thereof, which may be used in conjunction with the present invention;

FIGURE 2 is a side view of FIGURE 1;

FIGURE 3 is a top plan view of a typical article delivery system per the present invention;

FIGURE 4 is a sectional view along lines 4—4 in FIGURE 3;

FIGURE 5 is a sectional view of the check acceptance means along lines 5—5 in FIGURE 6;

FIGURE 6 is an elevational view, partly in section, of the check acceptance means;

FIGURE 7 is a schematic electrical circuit diagram showing the interconnection of the various electrical components and of the control circuit for operating the above described embodiment of the invention;

FIGURE 8 is a schematic block diagram of an alternative arrangement of my invention when an automatic conveying means is used for article delivery;

FIGURE 9 is a schematic electrical circuit diagram of the comparator circuit per FIGURE 8;

FIGURE 10 is a plan view of the front panel of the display means;

Figure 11A:
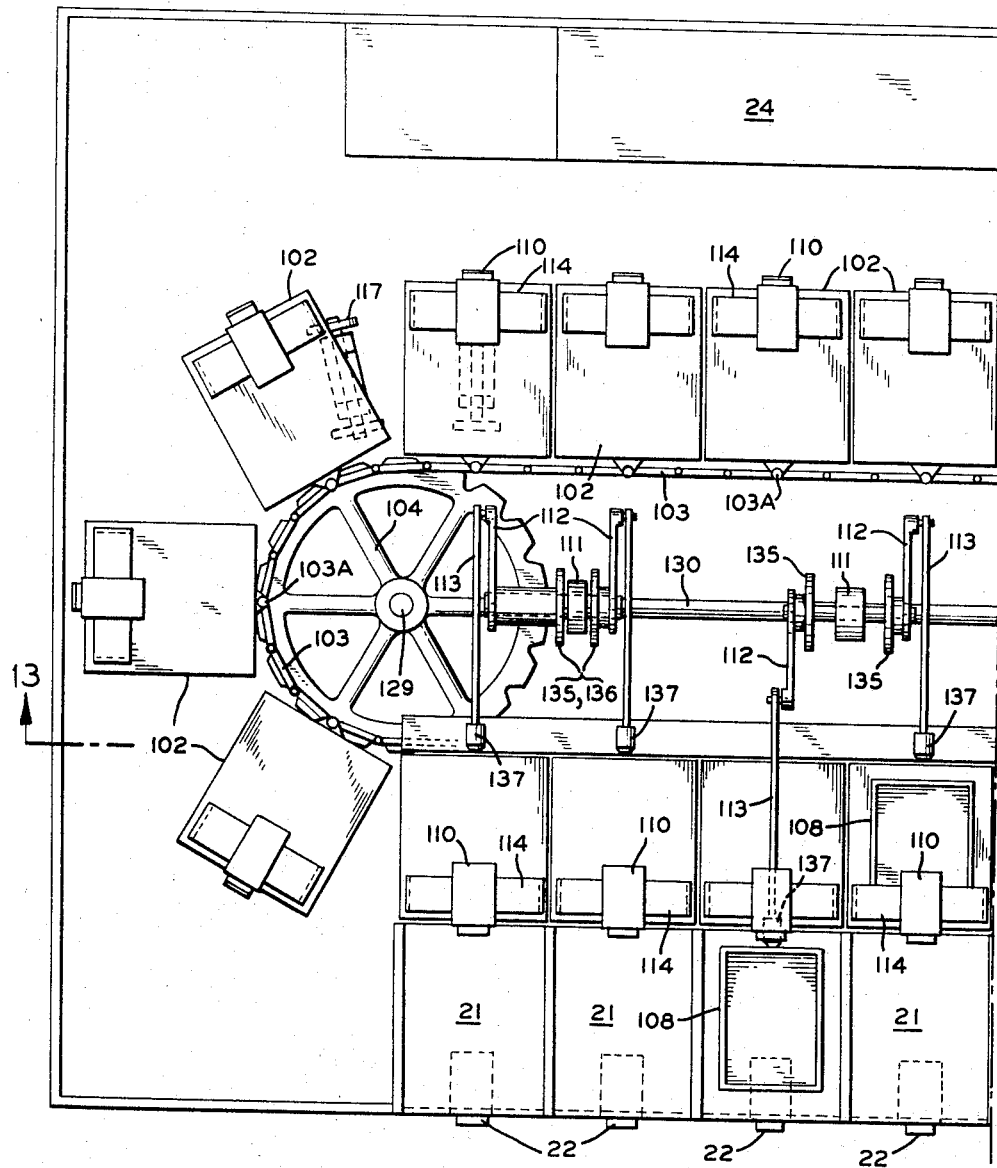
Figure 20:
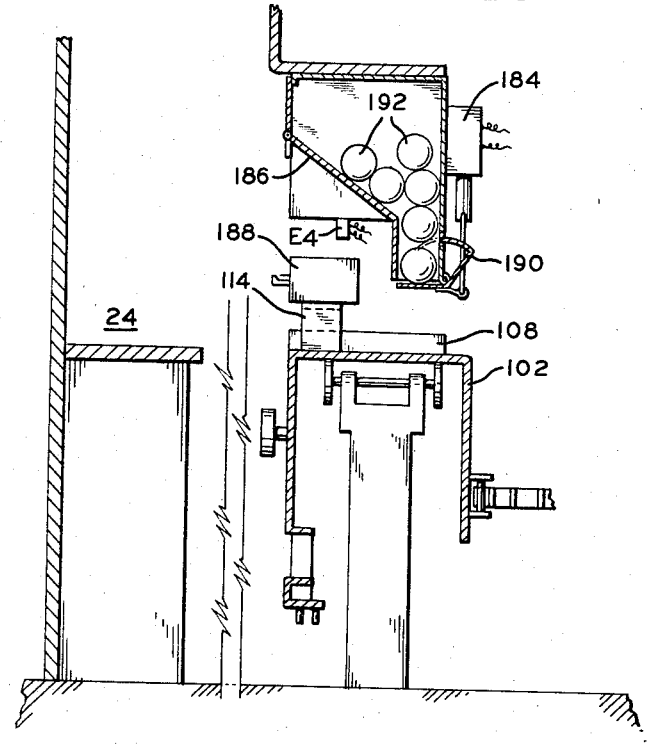
Figure 21:
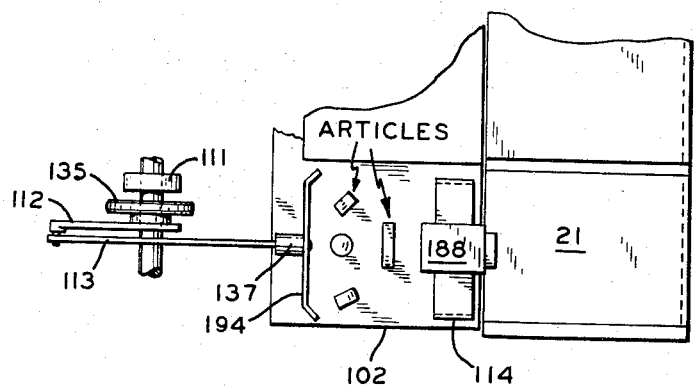

FIGURES 11A and 11B comprise a top plan view of the article delivery system using automatic conveying means;

FIGURE 12 is a sectional view along lines 12—12 in FIGURE 11;

FIGURE 13 is a sectional view along lines 13—13 in FIGURES 11 and 12;

FIGURE 14 is a view showing the arrangement of FIGURE 11;

FIGURE 15 is a top plan view of another check means suitable for automatic order filling purposes;

FIGURE 16 is an elevational view, partly in section, of the ticket reading unit operable in conjunction with the check or ticket per FIGURE 15;

FIGURE 17 is a sectional view of the ticket unit along lines 17—17 in FIGURE 16;

FIGURE 18 is a schematic electrical circuit diagram;

FIGURE 19 is a top plan view of a portion of the article delivery system using automatic conveying means and automatic article dispensing means;

FIGURE 20 is a view along lines 20—20 in FIGURE 19;

FIGURE 21 is a top plan view of still another modification; and

Figure 22:
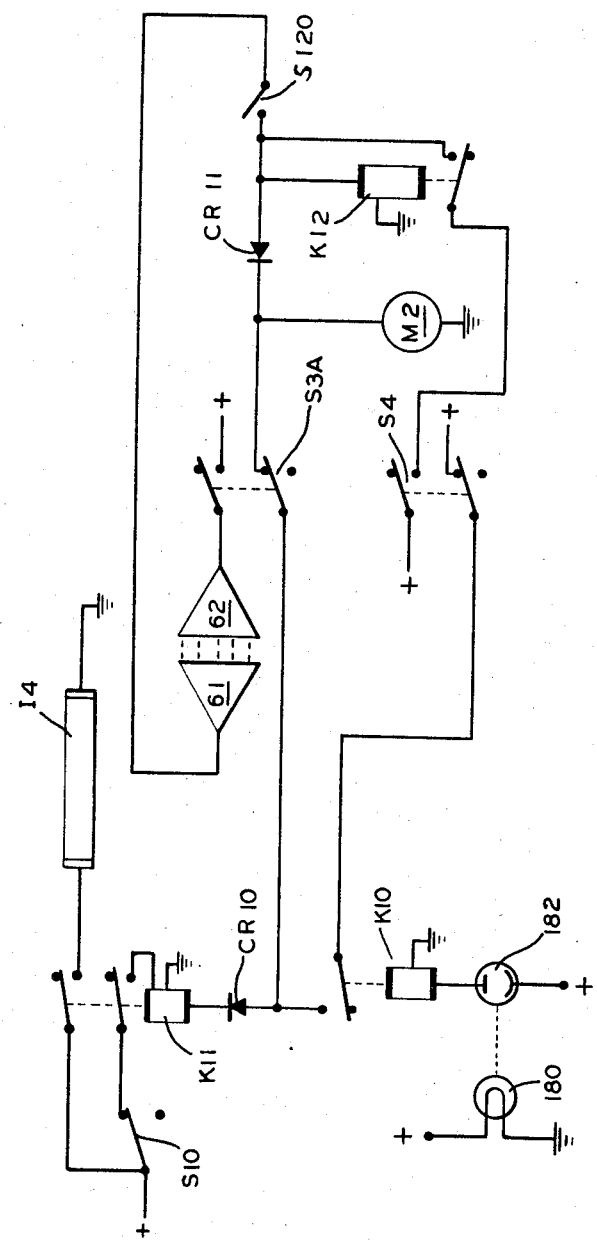

FIGURE 22 is a schematic electrical circuit diagram.

The ticket

Referring now to the figures and FIGURES 1 and 2 in particular, numeral 10 refers to an ordering ticket which has a lower ordering portion 11 and a separable upper stub 12 which may be detached at a perforated line 13. This ticket 10 may be fabricated from card stock or cardboard and each such ticket may be made as a package which comprises the ticket 10, an underlying carbon paper 14 and a tissue paper record copy 15 as seen in FIGURE 2. This package is similar to charge tickets used quite conventionally with credit cards. Alternatively, the carbon paper 14 may be deleted when pressure sensitive copy paper is used.

Each ticket is provided with a quantity column, an item column, a price column and such other printed information as is deemed necessary or desirable. Also, the main ticket portion 11 and the stub portion 12 are provided with arrows which show the direction for subsequently inserting these portions, properly oriented, in sensing means which will be described later. Along the perforated line 13, the ticket 10 is provided with a plurality of binary positions 16, the absence of a perforation signifying a binary "zero" and the presence of a perforation signifying a binary "one." As shown in FIGURE 1, there are, for illustrative purposes, seven binary positions 16. Also, as seen, the binary positions "2," "8," "32," and "64" are punched out, while the positions "1," "4," and "16" are left unpunched. Thus, the number "106" is developed which is indicated in standard decimal notation on the main body of the ticket, reference numeral 17, and on the stub, numeral 18. Therefore, the ticket is identified by the number "106." The binary perforations are used in conjunction with electrical switches or photoelectric means and a relay network also known as a "relay tree" to provide a decimal output which is adapted to serve as a visual display.

A patron fills out the ticket by noting certain selections, such as several items which constitute a meal, and then presents the ticket to a cashier who collects the proper amount of money and returns the stub 12 to the patron. The cashier separates the ticket package, retaining the tissue copy 15, and passes the main ticket portion 11 to an order filling station. The ticket and stub portions, when presented to the cashier, may be provided with a date and a time stamp to provide still further identification and validation. Also, the ticket 10 may be constructed to operate in conjunction with an automatic computing means as is described in my copending application for U.S. Letters Patent Ser. No. 470,779, filed July 9, 1965, entitled "Computing and Recording System."

*Manual mode of article delivery system*

The ticket thus prepared is used in conjunction with the article receiving positions shown in FIGURE 3 wherein the numeral 21 identifies a plurality of article receiving positions, each such position being provided respectively with a check stub acceptance means 22 and an indicia display means 23. The patron selects an available position 21 and deposits his retained ticket stub 12 in the associated check stub acceptance means 22. The identifying stub number 18 is displayed by the associated display means 23.

The main ticket portion 11 meanwhile has been transferred to the order filling station 24 where the order is filled. When the order is complete and suitably placed on a tray, an attendant, in the manual mode of operation, delivers the tray with the articles to the receiving position 21 whose display means 23 displays the identifying number of the stub which coincides with the number of the main ticket portion 11 transferred to the station 24 for filling the order. Preferably, the ticket portion 11 is placed on the tray together with the order for return to the patron so as to assure identification of the delivered article or articles.

FIGURE 4 shows the construction of an article receiving position 21 which includes a frame comprising two vertical panels 31 and 32 and a horizontal article receiving platform 33. A barrier 34 divides the order filling side containing the order filling station 24 from the customer's side. The barrier is provided with a hinge 35 to support a swinging panel 36. As seen in FIGURE 4, an article 37 has been deposited on the platform 33 and is about to be pushed toward the customer's side, causing the panel 36 to temporarily swing toward the right, indicated by the dashed lines. Movement of the panel 36 may be controlled manually or automatically, as for instance by a tripping switch or a photoelectric control means.

Each article receiving position 21, as shown in FIGURES 3 and 4, is provided with a check stub acceptance means 22 into which the customer inserts his stub 12. The identifying number of the stub is decoded and displayed on the front panel of the display means 23. This display means, in its simplest embodiment, comprises a standard annunciator panel. The attendant places the respective order on the platform 33, pushes the article 37 underneath the barrier 34 toward the customer's side and then operates a push button control switch S1 which cancels the display on the display means 23 and also renders the stub 12 inserted into the check stub acceptance means 22 inaccessible for withdrawal by the customer. In an alternative embodiment, the switch S1 is mounted on the platform 33 to be actuated by the deposit of an article 37 thereupon. In this manner the display is cancelled fully automatically and the stub is rendered inaccessible for surreptitious removal responsive to the delivery of the article.

Instead of the decoding means for the binary code in combination with the annunciator unit, for the purpose of a relatively simple and inexpensive arrangement, direct optical projection of the stub numeral 18 may be accomplished by a standard optical projection means, such as an opaque projector.

FIGURES 5 and 6 show the detailed construction of the check stub acceptance means 22. This acceptance means comprises, as its main parts, an entrance slot 41 for receiving therein the stub 12, two pairs of rollers 42, 43, 44 and 45 which are journalled in the supports 46 and 47. The upper rollers 42, 43 are coupled to one another by a set of endless belts, such as two O-rings 48, 49, and the lower rollers 44 and 45 are coupled to one another by a simliar set of O-rings 50 and 51. The roller 45 is coupled to an electric motor M1 via a suitable gearing 52. Since the upper rollers and the lower rollers are in frictional contact with one another, operation of the motor M1 causes rotation of all of the rollers. The rollers and gaskets are so dimensioned that a stub inserted at the entrance slot 41 is carried into the acceptance means, retained therein until the respective article is delivered, and then is discharged into a receptacle 53 from which such stub cannot be removed surreptitiously. The check stub acceptance means includes, further, a source of illumination I1 and a photoelectric cell E1, disposed at the entrance slot 41, a switch S2 and a switch S3 within the acceptance means, and a plurality of lamps I2 and corresponding photoelectric cells E2, one such lamp and cell being disposed to sense each of the respective binary digit positions 16 of the stub as described in connection with FIGURE 1.

Operation of the acceptance means 22 in conjunction with the display means 23 and the control circuit may be visualized as follows, referring also to FIGURE 7. As the stub is passed through the entrance slot 41, a light beam which normally exists between the lamp I1 and the photoelectric cell E1 is broken. This action causes the time delay relay K1 to be deenergized and the motor M1 to rotate via the now closed contact associated with the relay K1 and the series connected closed switch S2. Hence, the stub 12 is drawn between the rollers 42 and 44 and advanced into the unit. A brief moment thereafter, the leading edge of the stub operates the switch S2, opening this switch, thus stopping the motor M1. At this moment, the binary codings 16 of the stub 12 are in alignment with the plurality of lamps I2 and the photoelectric cells E2. The upper contact of the switch S2 energizes the decoding unit 55, a relay tree, which receives the binary input signals from the plurality of photoelectric cells E2 and provides a decimal output signal to the display means 23. When the article 37 has been delivered to the platform 33 and the switch S1 is actuated, either manually or automatically, the motor M1 is reactivated and the relay K2 is energized. This relay in conjunction with the feed switch S3 clears the stub from the acceptance means 22, the stub being discharged into the receptacle 53 which is disposed so as to be inaccessible for surreptitious removal from the customer's side. Alternatively, a shredder unit may be attached to the rollers 43 and 45 to shred the stub during its ejection from the acceptance means 22.

Instead of disposing an annunciator panel at each station, a central annunciator panel may be provided which displays the stub numeral in association with a respective article receiving position. Alternatively, such a central panel may be provided in addition to the individual display units described.

*Automatic mode of article delivery system*

An alternative embodiment comprises the use of a conveying means for automatically conveying the article to the article receiving position which has been selected by the customer. In this automatic mode of operation, the customer, as described previously, deposits the stub 12 in one of the check stub acceptance means 22 while the lower ticket portion 11 together with the article is placed on a conveying means and conveyed thereby past the several receiving positions 21. Control means, upon determining the existence of correlation between the stub portion 12 and the main ticket portion 11, cause the article 37 to be conveyed from the conveying means to the respective position 21. The receiving positions form sidings of the conveying means.

The schematic block diagram of this embodiment is shown in FIGURE 8. The ticket stub 12 is inserted by the patron in a selected acceptance means 22 of an article receiving position 21 which is provided with a sensing unit 61 to decode the binary coding of the stub. The ticket portion 11 which is associated with the article is placed by the attendant preparing the order in a ticket identifying unit 62 which is associated physically with the conveyor section carrying the order. The ordered article with the ticket 11 is conveyed by the conveying means past the positions 21. When correspondence of the binary coding between the ticket 11 and the stub 12 is established, an output signal is generated to the control circuit 63 which, in turn, causes the article to be transferred from the conveying means to the respective article receiving position 21 and, simultaneously, causes the stub 12 to be ejected from the check stub acceptance means 22 and rendered inaccessible for surreptitious removal. Also, the ticket 11 is ejected from the identifying unit and delivered with the article. The sensing unit 61 and the unit 62, is one embodiment, comprise respective panels and relay trees as described in connection with the unit 55 (FIGURE 7), both units 61 and 62 being connected to one another to form a comparator circuit. Interconnection between both units is accomplished by light beams 65. Upon the occurrence of coincidence an output signal is provided to the control circuit 63.

The control circuit, which includes a one-revolution clutch to be described later, causes the article to be transferred from the conveying means to the respective article receiving position. Moreover, the stub is ejected from the check acceptance means as described before, and the ticket which rides along the conveying means in the ticket identifying unit is ejected upon the tray having the articles. The ticket identifying unit is substantially identical in construction with that of the check acceptance means 22.

Alternatively, the ticket and stub sensing units may comprise standard optical character scanners and decoding means as are shown for instance in U.S. Patents No. 2,896,763 to D. G. Gisser et al., dated July 28, 1959; No. 2,552,156 to H. De France dated May 8, 1951; or No. 2,663,758 and No. 2,897,481 both issued to D. H. Shepard and dated respectively Dec. 22, 1953 and July 28, 1959.

Moreover, magnetically coded check means may be employed in conjunction with decoding units and a coincidence circuit, all as are known to those skilled in the art.

FIGURE 9 is an elaboration of the specific comparator circuit shown as a part of the block diagram of FIGURE 8. For illustrative purposes a three-digit binary input is shown for both the ticket portion and the stub portion to provide a total of eight outputs. The output of the stub decoder is an array of miniature lamps I101. As described previously in connection with FIGURES 4 and 7, these lamps are contained in the display unit 23 and are arranged in a housing having a transparent front panel 121 as indicated in FIGURE 10. Depending upon the stub number 18, a corresponding lamp I101 is energized.

An output panel, sensitized responsive to the number 17 of the ticket portion 11, accompanies the article tray as such a tray is carried by a section of the conveying means. This output panel is essentially a mechanical duplicate of the display panel 121, FIGURE 10, but is provided with photoelectric cells E101, instead of lamps, so that as the output panel is carried by the conveying means it comes into and out of mechanical alignment with a respective display unit, providing for a brief alignment, or registration, of respective lamps and photocells. When a conveyor section carrying an article tray is in register with an article receiving position 21, a synchronizing switch S120, see also FIGURE 8, is closed by the conveyor. A voltage from switch S120 illuminates one of the lamps I101 of the display means, the lamp illumination being responsive to the coded numeral of the stub as sensed by switches or photocells. If the numeral on the stub matches the numeral on the ticket, then a light from one of the lamps I101 strikes a matching sensitized photocell E101, thus providing an output signal which appears as a coincidence signal to cause the various control functions indicated in FIGURE 8. As mentioned heretofore, the above sensing and comparator circuit is merely illustrative of a variety of code or character reading and comparator circuits which may be used in conjunction with this particular application.

Referring now to the mechanical embodiment of the alternative mode which uses automatic article delivery means, employing a controlled conveying means and FIGURE 11 in particular, there is shown an enclosure 100 which contains among other parts a conveying means having eighteen articulate sections 102 and an endless chain 103 which is drawn by a sprocket 104 and an idler sprocket 105. An order filling area 24 is disposed at the rear of the enclosure 100. This area is similar to that in FIGURE 3 and serves for placing articles ordered on the trays 108 for delivery to the customer. At the front of the enclosure are shown six article receiving positions 21. Each such position contains a check stub acceptance means 22 of the type previously described. Each conveyor section 102 carries a ticket identification and delivery unit 110 which is similar to the check stub acceptance means 22 described heretofore and the electrical circuit shown in FIGURE 9. Arranged in the center of the conveying means are stanchions 111 which support the crank arms 112 and associated delivery plunger 113. At the third position 21 from the left, a crank arm 112 and a plunger 113 are shown in the extended position, having just delivered a tray 108 to the respective position and being about ready for resuming the normally retracted position.

Referring now also to FIGURE 12, the U-shaped cross section of the respective conveyor sections 102 is evident. Each section is adapted to receive and carry a tray 108. Also shown is the ticket identification unit 110 mounted on a bracket 114 which is fastened to the respective conveyor section. As each section comes into register at a respective article receiving position 21, the ticket stub numeral display panel 121 comes into alignment with an opposing panel 122, which is the output panel sensitized to the numeral of the ticket as stated heretofore. The guides 119 engage a wheel 118 attached to the conveying means to ascertain accurate registration of the respective conveyor section with the article receiving station. The display panel 121 and its circuit are coupled to the check stub acceptance means 22 via a cable 123.

The ticket numeral output panel 122 is coupled to the ticket identification unit 110 via a cable 124. The synchronizing switch S120 is disposed for actuation by the wheel 118 attached to the conveying means at the precise moment of mechanical registration between the stub display panel 121 and the ticket responsive panel 122. Closing of the switch applies power to the electrical circuit and when coincidence of the respective numerals exists, the ticket 11 is ejected from the unit 110 onto the tray 108 containing the articles with which the ticket is associated. Also, the tray is moved by means of the plunger 113 from the conveying means on to the position 21 for receipt by the patron.

As the conveyor sections are moved peripherally by the chain 103, the sections ride on rollers 117 affixed to a shaft 116 mounted in the stanchions 115. There is a plurality of these rollers to ensure smooth passage of the article bearing trays. Numeral 125 shows a bracket on which is mounted a set of electrical contact strips to provide electrical energy to the ticket identifying unit 110. The contacts 126 conduct the electrical energy.

Referring also to FIGURE 13, the electric motor 127 through a speed reducer 128 drives shafts 129 and 130. A support 131 supports the horizontal shaft 130 and the idler sprocket 105 and the shaft 132. The shaft 129 drives the sprocket 104 which is coupled to the idler sprocket 105 by the endless chain 103. As mentioned heretofore, each conveyor section 102 is attached to this chain by means of a coupling pin 103A.

The shaft 130, which revolves continuously, is supported by the stanchions 111. Located on the shaft 130 are single-revolution clutches 133 connected to sheaves 134 which are coupled to sheaves 135 by corresponding V-belts 136. Each sheave 135 is coupled to a crank arm 112. When the single-revolution clutch is actuated, the sheaves 134 and 135 and the crank 112 complete one revolution cycle, thus causing the arm 113 and the plunger 137 (FIGURE 12) to push the respective tray 108 from the associated conveyor section 102 to the receiving position 21 which forms a siding. Each stanchion 111 supports a pair of delivery arms for moving trays disposed on an adjacent pair of conveyor sections.

When a respective conveyor section 102 is in register with an article receiving position 21 and coincidence of the identifying numerals occurs, the resulting coincidence signal causes operation of the respective single revolution clutch 133, actuation of the relay K2 in the stub acceptance means control circuit, FIGURE 7, and operation of the corresponding relay in the associated ticket identifying means 110, thus providing for the respective ejection of the stub into the receptacle 53, FIGURE 6, and for the ejection of the ticket from the unit 110 to the tray 108. In the absence of a coincidence signal, the tray with its articles is maintained on the conveying means and is passed consecutively to the various article receiving positions until either a match between the ticket and stub is found or the tray is removed from the conveying means.

*Automated order filling and article delivery system*

A further modification comprises the automatic order filling or article assembling in accordance with the markings provided on the ticket. Such automatic means, therefore, supplements or replaces the manual article filling occurring at the station 24. Most conveniently, suitable article storage and dispensing means are provided in cooperative relationship with the upper left hand portion of the conveyor, FIGURE 11A, at a position opposite the work station 24. The necessary modifications of the conveyor system, of the ticket means, of the ticket identifying means, the electrical circuit and the like are shown in FIGURES 15–20 and 22.

FIGURE 15 shows an ordering ticket for automated order filling. Except for minor modifications, the ticket is substantially identical with that shown and described in FIGURES 1 and 2. The ticket shown in FIGURE 15 has a separable upper stub 12, which is the same as that shown in FIGURE 1, but has a lower portion 11A which makes provision for the purchase of articles by means of preprinted choices. On each line of the column 150 a preprinted item is shown along with the cost of the particular item. The respective lines of the "QTY" column 152 may be punched with a hole 154 to signify the selection and purchase of the article shown on that line. The upper stub half is used by the patron as before in an available article receiving position 21 (FIGURES 4 and 11) and the main ticket portion 11A is placed by an attendant or the patron in a ticket reading and identifying unit located above the tray position on the conveyor. As later described in connection with FIGURE 19, the tray with the ticket in the accompanying reading and identifying unit proceeds on the conveyor, both pass beneath hoppers and, by means of signals received by photocells located beneath the hoppers, an article is released onto the tray in accordance with the line selected and punched on the ticket portion 11A, and further to deliver the now filled tray and the ticket to the patron at the station selected by the patron responsive to the patron having deposited the matching stub in the check stub acceptance means 22.

FIGURES 16 and 17 show the construction of the ticket sensing (reading) portion of the ticket identifying means 188 as is necessary for the automated order filling system. This means comprises an entrance slot 156 for receiving the lower ticket portion 11A, and includes also two pairs of rollers 158, 160, 162 and 164 which are journalled in supports 166 and 168. The upper rollers 160 and 162 are coupled to one another by a set of belts, such as O-rings 170 (not visible) and 172, and the lower rollers 158 and 164 are coupled to one another by a similar set of O-rings 174 and 176, FIGURE 17.

The lower roller 164 is coupled to an electric motor M2 via a suitable gearing 178. Since the upper and lower rollers are in contact with each other through the respective belts, operation of the motor M2 causes rotation of all of the rollers. The rollers and belts are so dimensioned that a ticket 11A inserted at the entrance slot 156 is carried into the ticket means, retained therein until the purchased items are dispensed upon the tray or conveyor section, then discharged onto the tray and delivered with the tray to the article receiving station selected by the matching stub.

The ticket identifying means includes, further, a source of illumination 180 and a photocell 182 both disposed at the entrance slot, a switch S3A, a switch S4, and a plurality of lamps I3, and a pluarity of corresponding photocells E3. One lamp and photocell combination is disposed to sense each of the respective binary digit positions 16 of the ticket, FIGURE 15. This sensing means is substantially identical with that described previously for the stub 12, FIGURES 1, 5 and 6.

In addition, the ticket acceptance means includes a tubular lamp I4 disposed beneath the hole position in the "QTY" column 152 of the ticket 11A to form a part of the sensing means when the ticket 11A passes beneath the hoppers containing articles available for dispensing as called for by the lines on the ticket.

The delivery of the tray to the proper article receiving position 21 selected by the use of the conveyor and matching ticket stub is the same as has been described previously.

FIGURE 18 shows the electrical circuit associated with the sensing of a punched hole at position 154 of each line of the ticket portion 11A and the dispensing of an article from an associated hopper upon the tray. The lamp I4 is energized when the ticket 11A is disposed in the ticket reading means 188 by a circuit shown in detail in FIGURE 22 and remains energized while the ticket is conveyed for one path past the article filling station. The lamp is disposed underneath the possible hole locations in the "QTY" column. As the ticket identifying and reading means and the originally empty tray are transported beneath respective article storing hoppers, photocells E4, located in staggered positions, see FIGURE 19, on the underside of the hoppers, are energized as the ticket is conveyed past and a punched hole is present in the ticket, that is, in line with a photocell. When such a coincidence takes place, a respectively associated solenoid 184 is operated which operates, in turn, a door on the hopper, depositing an article on the slowly passing tray by gravity. It will be apparent that the articles stored in the hoppers coincide line by line with the printed selections on the ticket. Hence, in a typical example, hopper #1 dispenses the selection arranged on line #1 of the ticket portion 11A, hopper #2 dispenses the selection on line #2, etc.

FIGURE 19, a plan view of the conveyor portion as it passes the filling station 24, and sectional view FIGURE 20 show how respective articles are released from an array of overhead storage bins 186 and assembled on the trays 108 in response to order signals on the ticket. There is a plurality of bins 186, one for each kind of article, along the station 24. Each tray passes first past a hopper #1, then a hopper #2, etc.

As the conveyor passes position "A" a tray 108 is placed on the conveyor section 102 and the ordering portion 11A of a ticket is placed by an attendant or the customer in the ticket acceptance means 188 carried by the conveyor section above the tray. As the conveyed tray 108 and ticket portion 11A in the respective reader 188 are moved, they pass consecutively beneath the individual hoppers or storage bins 186. Located on the underside of each individual hopper is a photocell E4, each cell on adjacent hoppers being displaced by the width of a line 154 on the ticket 11A. In this manner as the tray and ticket pass hopper #1, the first line on the ticket is in register with the photocell on hopper #1. When passing under hopper #2, the second line is in register with the photocell under hopper #2 and so on as the conveyor moves the tray and ticket past and underneath the hoppers. Each hopper contains an article which is described on the line that registers with the photocell located on that hopper.

When a hole appears in a line of the "QTY" column on the ticket 11A and is in register with a photocell on the hopper a signal causes the solenoid 184 to be energized, operating an associated door 190 to release an article 192 onto the underlying tray 108 by gravity. The door is constructed so that only one article at a time can be delivered. Other means can be used for releasing and dispensing an article as are standard in the vending industry for the delivery of articles.

FIGURE 21 shows a modification of the delivery means to the patron wherein the delivery plunger arm 113 and plunger 137 are fitted with a cross bar 194. In this particular embodiment a tray 108 would not be required and the articles can be deposited directly on the surface of the conveyor section 102. When the appropriate article receiving position 21 is reached as described hereinbefore, the cross bar 194 moves the articles from the conveyor section surface onto the receiving station 21.

*Control circuit for automated order filling, FIGURE 22*

When a ticket 11A is introduced into the ticket device 188 through its entrant slot 156, FIGURES 16 and 17, a light beam emanating from the lamp 180 and impinging on the photocell 182 is broken. When the beam is broken, the relay K10 is deenergized and a voltage is applied across the coil of the relay K11. The relay K11 is energized and locks in via the switch S10, physically located on the ticket means 188 (FIGURES 16 and 19) and the lower contact of the relay K11. The upper contact of the relay K11 energizes the tubular lamp I4 to illuminate the respective article selection punched holes.

The opening of the relay K10 also applies a voltage to the motor M2 via the switch S3A. The motor M2 causes the drive rollers 158, 160, 162 and 164 to rotate and draw the ticket 11A into the unit 188 until the leading edge of the ticket operates the switches S3A and S4, see also FIGURE 17.

Operation of the switches S3A stops the motor M2 and also applies a voltage to the comparator circuit 62, 61. When the ticket is fully in the unit 188 the time delay relay K10 is energized once again, the trailing edge of the ticket 11a having cleared the entrance slot.

As the ticket unit 188 and the tray proceed under the hoppers, articles are dispensed upon the tray in response to the punched holes on the ticket 11A as described previously, and the lamp I4 remains energized. When the last hopper 186 of the array is passed, a projection under the hopper (not shown) momentarily trips the switch S10 of the respective ticket unit 188, causing the relay K11 to deenergize, thus extinguishing the lamp I4.

As the tray reaches a delivery position 21 and coincidence exists between the numerical codes of the ticket portion 11A and the stub 11 as evidenced by the comparison circuit 61 and 62, a coincidence signal is generated which appears at switch 120 which momentarily is closed at the conveyor position required for delivery of the articles to the particular station. The existence of this signal starts the motor M2 and operates the relay K12 and the ticket is driven out of the unit and delivered onto the tray for delivery with the articles as described previously, see also FIGURE 8.

In the event that a coincidence signal is not present as the particular conveyor section with its ticket unit passes past the array of stations 21, the ticket 11A remains in the unit 188 and the tray on the conveyor circulates once again about the conveyor loop. Since the switch S4 is actuated by the leading edge of the ticket, there is no voltage applied to the contact of the relay K10 and the relay K11 does not operate nor will the motor M2 be energized to draw a new ticket into the unit, if attempt to do so were made. Thus, the original ticket 11A and the tray pass again underneath the array of hoppers, but this time, since the lamp I4 is extinguished, duplicate dispensing of articles is precluded. Rectifiers CR10 and CR11 serve to prevent current flow in the nondesired direction.

An alternative order filling arrangement would comprise the sensing of the ticket portion, storing the ordering information in a storage means and then assembling the order by supplying the articles in accordance with the stored information as the particular conveyor section passes past the order filling station.

The check means as used in the above described arrangement serves for associating an article with an article receiving position. In order to accomplish this, the check means imparts code designation to the otherwise uncoded article and the receiving position. When correlation of a set of check means is established, the ordered article is matched with the respective receiving position and, hence, with the patron. As stated above, such correlation may be achieved by an suitable means using graphic data and indicia, magnetic information, electrically conductive means, mechanical indexing means, etc. The check stub retained by the customer, when inserted in a respective article receiving position, codes this position so that the article which has been associated with the related code at the time the order was prepared or filled is delivered at the station so coded.

While there has been described and illustrated a preferred embodiment of my invention and several modifications have been indicated, it will be apparent to those skilled in the art that various further changes and modifications may be made therein without departing from the broad principle and intent of this invention.

What is claimed is:
1. An article delivery system comprising:
   a plurality of article receiving positions;

a conveying means disposed for receiving an article and for conveying such article to a selected one of said positions;

means disposed in cooperative relationship with said positions for receiving a first check means having a code whereby in response to such receipt one of said positions becomes a selected one;

means disposed for receiving a second check means having a code correlated with that of said first check means and having additionally a further code denoting an article selection;

means disposed for sensing the article selection code on said second check means and in response thereto providing a selected article on said conveying means; and further means coupled to said conveying means and disposed for comparing the code on said first check means with said correlated code on said second check means and causing said conveying means to convey such article to said selected position responsive to the existence of correlation of said respective codes.

2. An article delivery system comprising:

a plurality of article receiving positions, each position adapted to receive a first check having a first code;

a conveying means disposed for passing past an order filling station having article storage and dispensing means and passing subsequently past said receiving positions;

means operatively associated with said conveying means for receiving a second check having a first code correlatable with the first code on said first check and having also a second code indicating an article selection;

control means adapted to be coupled to said article storage and dispensing means and to said means associated with said conveying means for sensing said second code and in response thereto causing the dispensing of an article from said storage means upon said conveying means as said conveying means passes past said order filling station; and further means coupled to said conveying means and to said article receiving positions and disposed for sensing the first code of said second check for conveying the article dispensed in response to said second code of said second check to that position whose first check has its first code correlated with that of said second check.

3. An article delivery system comprising:

a plurality of article receiving positions, each including a check receiving means for receiving a first check bearing a first code and including means for providing a signal responsive to such first code;

a conveying means comprising sections disposed for conveying articles disposed on respective sections to said positions; each of said sections including a check receiving means for receiving a second check bearing a first code correlated with that of said first check and also a second code indicative of an article selection, and said receiving means providing a signal responsive to such codes;

means coupled to said conveying means for causing said conveying means to consecutively convey said sections past an order filling station and past said positions;

article storage and dispensing means disposed at said order filling station for dispensing articles upon said conveying means;

control means coupled to said storage and dispensing means and adapted to receive signals responsive to said second code indicative of article selection and in response thereto dispensing an article from said storage means upon said conveying section with which said second check is associated;

means coupled to said respective check receiving means for causing a comparison of said first code responsive signals as each section having a code bearing check passes one of said positions and upon determining the existence of correlation of said respective signals providing an output signal; and delivery means coupled to said conveying means and adapted to be actuated responsive to said output signal for causing the article on said respective section to be conveyed from said conveying means to said respective position.

4. An article delivery system comprising:

a plurality of article receiving positions, each including a stationary platform and a check receiving means for receiving a first check bearing a first code and for providing a signal responsive to such first code;

a conveying means comprising sections, each adapted to support articles, disposed for conveying such articles to said positions, each of said sections including a further check receiving means for receiving a second check bearing a first code, correlated with the first code of said first check, and a second article selection code and providing signals responsive to said respective codes;

means coupled to said conveying means for causing said conveying means to consecutively convey said sections past an order filling station and subsequently past said positions;

article storage and dispensing means disposed at said order filling station for dispensing articles from storage upon said respective conveyor sections;

control means adapted to be coupled to said further check receiving means and to said article storage means for receiving a signal responsive to said article selection code of said second check and in response thereto dispensing an article from said storage means upon said respective conveyor section as such section passes said order filling station;

means coupled to said respective check receiving means for causing a comparison of said first code responsive signals as each section having a code bearing check passes one of said positions and upon determining the existence of correlation of said first signals causing an output signal; and delivery means coupled to said conveying means and adapted to be actuated responsive to said output signal for causing a respective article on said section to be removed from said conveying means and deposited upon a platform of a respective receiving position whose first code responsive signal correlates with that of the second check associated with said conveying means section.

5. An article delivery system as set forth in claim 4 and including means for depositing the second check from said further check receiving means with the article with which the check is associated by virtue of said second code.

6. An article delivery system as set forth in claim 4 wherein said conveying means comprises a loop and said article receiving positions are disposed adjacent said loop, and said delivery means are adapted to engage an article and move it from a respective conveyor section upon an adjacent platform of a respective position.

7. An article delivery system as set forth in claim 4, said article storage and dispensing means comprising a plurality of storage means for storing articles correlated with the article selection code of said second check.

8. A article delivery system as set forth in claim 7, said plurality of storage means being disposed along the path of said conveyor sections and arranged in sequence to be correlated with a similar sequential arrangement of the second code disposed on the second check.

9. An article delivery system as set forth in claim 4, said conveying means forming a continuous loop about which said sections are adapted to be conveyed, said article receiving positions and said article storage means being disposed along said loop, and control means effective to prevent the dispensing of articles from said storage means when a section having a second check passes past said article storage and dispensing means a second time while being conveyed about said loop.

10. An article delivery system comprising:
a plurality of article receiving positions;
a conveying means disposed for receiving an article and for conveying such article to a selected one of said positions;
a first and a second correlated check means;
said first check means adapted to be associated with one of said receiving positions whereby in response to such association such position becomes a selected position;
said second check means including a code means for indicating an article selection and adapted to become associated with an article conveyed by said conveying means to said selected station; and
means coupled to said conveying means and disposed for sensing the article selection code means on said second check means and in response thereto providing a selected article on said conveying means and causing such article to be conveyed to said selected position.

References Cited

UNITED STATES PATENTS

| | | | |
|---|---|---|---|
| 2,997,133 | 8/1961 | Gehrke. | |
| 3,263,776 | 8/1966 | Kroemer | 186—1 |
| 3,326,325 | 6/1967 | Bradley | 186—1 |
| 3,339,671 | 9/1967 | Simjian | 186—1 |

SAMUEL F. COLEMAN, *Primary Examiner.*